United States Patent
Barron et al.

(10) Patent No.: US 7,671,792 B2
(45) Date of Patent: Mar. 2, 2010

(54) GLOBAL POSITIONING RECEIVER WITH SYSTEM AND METHOD FOR PARALLEL SYNCHRONIZATION FOR REDUCING TIME TO FIRST NAVIGATION FIX

(75) Inventors: Kenneth S. Barron, Plano, TX (US); Jeff M. Horslund, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 850 days.

(21) Appl. No.: 10/999,429

(22) Filed: Nov. 30, 2004

(65) Prior Publication Data
US 2005/0212698 A1 Sep. 29, 2005

Related U.S. Application Data

(60) Provisional application No. 60/556,355, filed on Mar. 25, 2004.

(51) Int. Cl.
*G01S 1/00* (2006.01)
(52) U.S. Cl. .................................................. 342/357.06
(58) Field of Classification Search ................................
342/357.01–357.17
See application file for complete search history.

(56) References Cited

U.S. PATENT DOCUMENTS

| | | | | |
|---|---|---|---|---|
| 5,402,347 A * | 3/1995 | McBurney et al. | .......... | 701/213 |
| 5,724,046 A * | 3/1998 | Martin et al. | .......... | 342/357.12 |
| 6,295,023 B1 * | 9/2001 | Bloebaum | .............. | 342/357.06 |
| 6,392,593 B1 * | 5/2002 | Pemble | .................. | 342/357.15 |
| 6,757,324 B2 * | 6/2004 | Fitzrandolph | ............... | 375/147 |
| 6,934,322 B2 * | 8/2005 | King et al. | .................. | 375/150 |
| 6,934,422 B2 * | 8/2005 | Hamza | ....................... | 382/293 |
| 7,184,461 B2 * | 2/2007 | Mehrnia et al. | ............. | 375/147 |

* cited by examiner

*Primary Examiner*—Thomas H Tarcza
*Assistant Examiner*—Nga X Nguyen
(74) *Attorney, Agent, or Firm*—Leonard A. Alkov

(57) ABSTRACT

A global positioning system receiver with a system and method for parallel synchronization. The novel receiver includes a correlator having plural demodulator channels for receiving a signal from a first satellite, and a processor for processing the signal from the first satellite using a plurality of the channels. The processor includes a parallel synchronization process for synchronizing the receiver with the signal. In an illustrative embodiment, the processor is adapted to instruct the plurality of channels to track the signal from the first satellite in parallel, each channel using a different timing hypothesis. Only the channel determined to have the correct timing is retained for tracking the satellite. For the first satellite only, the processor also demodulates the hand-over word and determines a GPS transmit time. The parallel synchronization process is then repeated for subsequent satellites in turn.

21 Claims, 9 Drawing Sheets

GLOBAL POSITIONING SYSTEM RECEIVER WITH AND METHOD FOR PARALLEL SYNCHRONIZATION FOR REDUCING TIME TO FIRST NAVIGATION FIX

CROSS-REFERENCE TO RELATED APPLICATIONS

This application claims the benefit of U.S. Provisional Application No. 60/556,355, PARALLEL SYNCHRONIZATION METHOD FOR REDUCING TIME-TO-FIRST-FIX OF GPS RECEIVERS by Kenneth S. Barron and Jeff M. Horslund, filed Mar. 25, 2004, the disclosure of which is hereby incorporated by reference.

BACKGROUND OF THE INVENTION

1. Field of the Invention

The present invention relates to electronics and electrical systems. More specifically, the present invention relates to GPS (global positioning system) receivers.

2. Description of the Related Art

The primary function of a GPS receiver is to determine the position and velocity of its antenna and GPS system time from signals transmitted by a constellation of satellites. To achieve this end, a GPS receiver must first acquire a coarse/acquisition (C/A) signal when the receiver's initial position, velocity, and estimate of GPS time are not known sufficiently well. After the C/A code signal is acquired, the receiver must perform a number of steps to correctly estimate the transmit time of the signal, which is necessary to compute a navigation fix. These steps require a certain amount of time that add to the receiver's time-to-first-fix (TTFF). A fast TTFF is crucial to many military as well as commercial applications.

The most time consuming steps that contribute to a receiver's TTFF are bit synchronization, frame synchronization, and demodulating the hand-over word (HOW) from the signals transmitted by the satellites. These steps are typically performed independently and in parallel for each satellite being tracked, using one demodulator channel per satellite. Thus for a particular satellite, bit synchronization must be achieved by successively trying different channel timing setups until the correct one is found. Prior art methods ordinarily used to determine the correct timing tend to be sensitive to the frequency of bit transitions during the data collection process and are also susceptible to the effects of interference or low signal strength. Consequently, if there are too few bit transitions while a given timing setup is being tested, or the signal strength fluctuates, the wrong timing hypothesis may be accepted. When this happens, the TTFF may be extended by a considerable amount of time.

Following bit synchronization, the receiver must determine where individual words and frames start within the navigation message. The data bits transmitted by each satellite are grouped into 30-bit words, which in turn are organized into a ten-word subframe. The first word of every subframe contains a pattern that allows the receiver to verify that it has correctly determined the beginning of words and subframes. The process of locating this pattern is generally referred to as frame synchronization, and since the data bits are transmitted at a 50 Hz rate, this operation can take up to six seconds to complete.

Demodulating the HOW is usually accomplished after the frame synchronization process completes. The HOW contains a 17-bit quantity called the time-of-week (TOW) count, which corresponds to the time of the week at the start of the next subframe. Once the receiver obtains the TOW count, it is able to determine the time of the week associated with every C/A chip. The time associated with any given chip of the C/A code sequence is referred to as transmit time and is heeded to compute a navigation fix.

Bit synchronization, frame synchronization, and obtaining the time-of-week count from the HOW are necessary because the C/A sequence repeats once per millisecond. When tracking the C/A code phase, the receiver can very accurately estimate the transmit time within a particular millisecond, however, it cannot determine which millisecond relative to a certain epoch. By performing the steps described previously, this ambiguity can be resolved by the receiver. As stated earlier, in the prior art, these steps (among others) are performed in parallel for each satellite being tracked and therefore require one demodulator channel per satellite. While straightforward in concept, this approach does not make the most efficient use of available channel resources to minimize TTFF.

Hence, a need exists in the art for an improved GPS receiver that offers a shorter TTFF than conventional GPS receivers.

SUMMARY OF THE INVENTION

The need in the art is addressed by the GPS receiver of the present invention.

The novel receiver includes a correlator having plural demodulator channels for receiving a signal from a first satellite, and a processor for processing the signal from the first satellite using a plurality of the channels. The processor includes a parallel synchronization process for synchronizing the receiver with the signal. In an illustrative embodiment, the processor is adapted to instruct the plurality of channels to track the signal from the first satellite in parallel, each channel using a different timing hypothesis. Only the channel determined to have the correct timing is retained for tracking the satellite. For the first satellite only, the processor also demodulates the hand-over word and determines a GPS transmit time. The parallel synchronization process is then repeated for subsequent satellites in turn.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
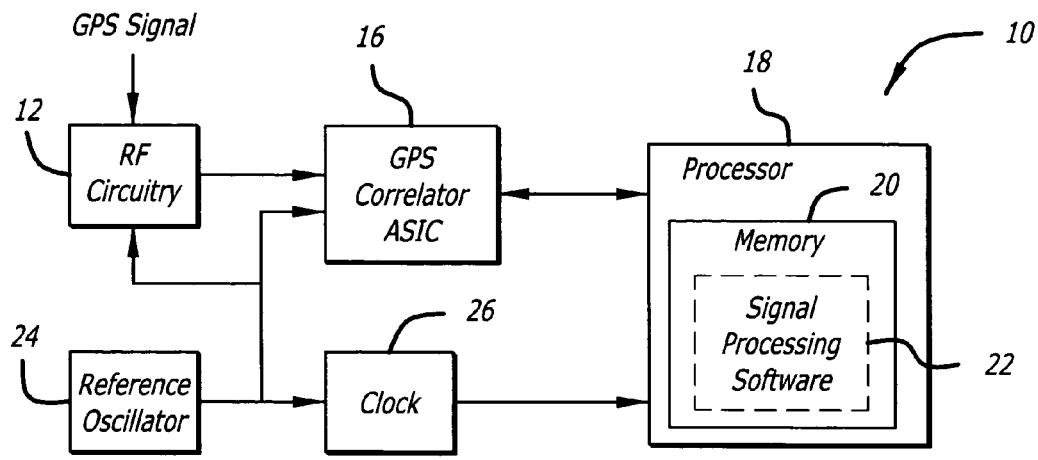
FIG. 1 is simplified block diagram of an illustrative embodiment of a GPS receiver designed in accordance with the teachings of the present invention.

FIG. 1 is simplified block diagram of an illustrative embodiment of a GPS receiver 10 designed in accordance with the teachings of the present invention. Note that this embodiment is primarily used to illustrate the concept, and clearly variations of the depicted architecture could also be used without departing from the scope of the present teachings.

The illustrative GPS receiver 10 includes radio frequency (RF) circuitry 12 for receiving GPS signals from a plurality of satellites and downconverting the signals to an intermediate frequency (IF) suitable for digital signal processing. A GPS signal includes a carrier signal that is modulated with a GPS data bit stream at a fifty data bits per second rate (twenty milliseconds per bit) that is spread by a coarse/acquisition (C/A) pseudo-noise (PN) code sequence at a 1.023 megahertz rate (one microsecond per chip) that is 1023 chips long (one millisecond). Each of the GPS satellites has a distinct PN code that enables the GPS receiver to distinguish the signal of one satellite from that of another satellite. The data bits carry a GPS message that is used by the GPS receiver 10 to compute a GPS-based time, position, and velocity. The GPS message is organized into subframes that are three hundred bits and six seconds in length. Each subframe includes an eight-bit preamble for subframe synchronization and a hand-over word (HOW) that includes information on the GPS transmit time at the start of the first data bit of the next subframe.

The RE circuitry 12 passes the downconverted GPS signal to a correlator or demodulator 16 having a plurality of hardware channels capable of processing the signal in parallel. Each channel of the correlator 16 is adapted to demodulate the GPS signal by generating a replica signal, correlating the replica signal to the GPS downconverted signal, and providing a correlation signal including the GPS bit stream to a processor 18. The receiver 10 also includes a reference oscillator 24 for providing a reference signal to the RF circuitry 12 and correlator 16, and to drive a clock 26, which generates a clock signal for the processor 18. The processor 18 includes an associated memory 20 for storing signal processing software 22 adapted to process the outputs of the correlator 16 and to provide processing instructions to the multiple channels of the correlator 16, such as phase and frequency information for driving the phase and frequency of the replica signal to correlate to the phase and frequency of the downconverted GPS signal. When the phase and frequency of the replica signal achieves a correlation threshold with the downconverted GPS signal, the GPS receiver 10 is said to have acquired a GPS satellite and to be tracking the GPS signal. In a preferred embodiment, the correlator 16 is implemented using an application specific integrated circuit (ASIC) having twenty or more hardware channels. (Most conventional commercial and military receivers have twelve or fewer channels.)

In accordance with the teachings of the present invention, the signal processing software 22 includes a novel parallel synchronization method that exploits the multiple demodulator channels and the specific characteristics of the GPS signal structure to reduce the receiver's time-to-first-fix (TTFF). Traditional methods for computing a fix involve performing bit synchronization and reading the HOW using only one hardware channel for each satellite that is in view; e.g., if there are twelve satellites visible, conventional receivers perform bit synchronization and demodulate the HOW twelve times, once for each satellite assigned to a given channel. The novel methods of the present invention make use of all resources (channels) for each satellite in turn, which permits the use of parallel methods that minimize TTFF.

Figure 2:
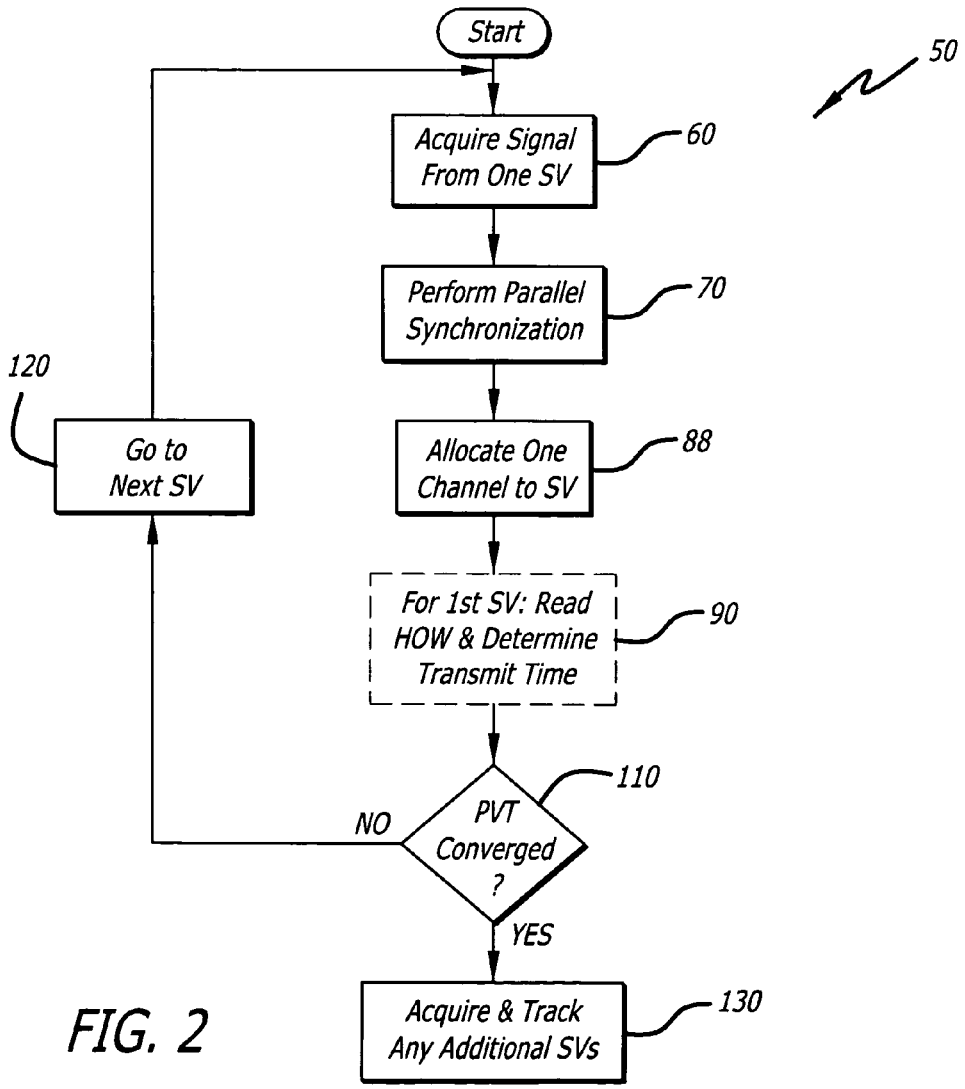
FIG. 2 is a simplified flow chart of an illustrative embodiment of a GPS signal processing method designed in accordance with the teachings of the present invention.

FIG. 2 is a simplified flow chart of an illustrative embodiment of a GPS signal processing method 50 designed in accordance with the teachings of the present invention. Additional embodiments of the novel method 50 are shown in greater detail in FIGS. 6, 8, and 11. In general, the method 50 employs multiple signal demodulator channels implemented in either hardware or software to efficiently synchronize the receiver's timing with the timing of the GPS signal (aligning the integrate and dump timing of the receiver with the phase of the transmitted data bits). In a preferred embodiment, twenty or more GPS signal demodulator channels are implemented in a hardware device (e.g., an ASIC 16) and the signal processing logic is implemented in a microprocessor or digital signal processor (DSP) 18, as shown in the receiver 10 of FIG. 1. Other implementations may be used without departing from the scope of the present teachings.

The novel method 50 begins at Step 60, allocating all available channels to acquire a signal from a first satellite, or space vehicle (SV). Following signal acquisition, at Step 70, a plurality of channels is instructed to process the received signal in parallel to synchronize the receiver with the signal.

Figure 3:
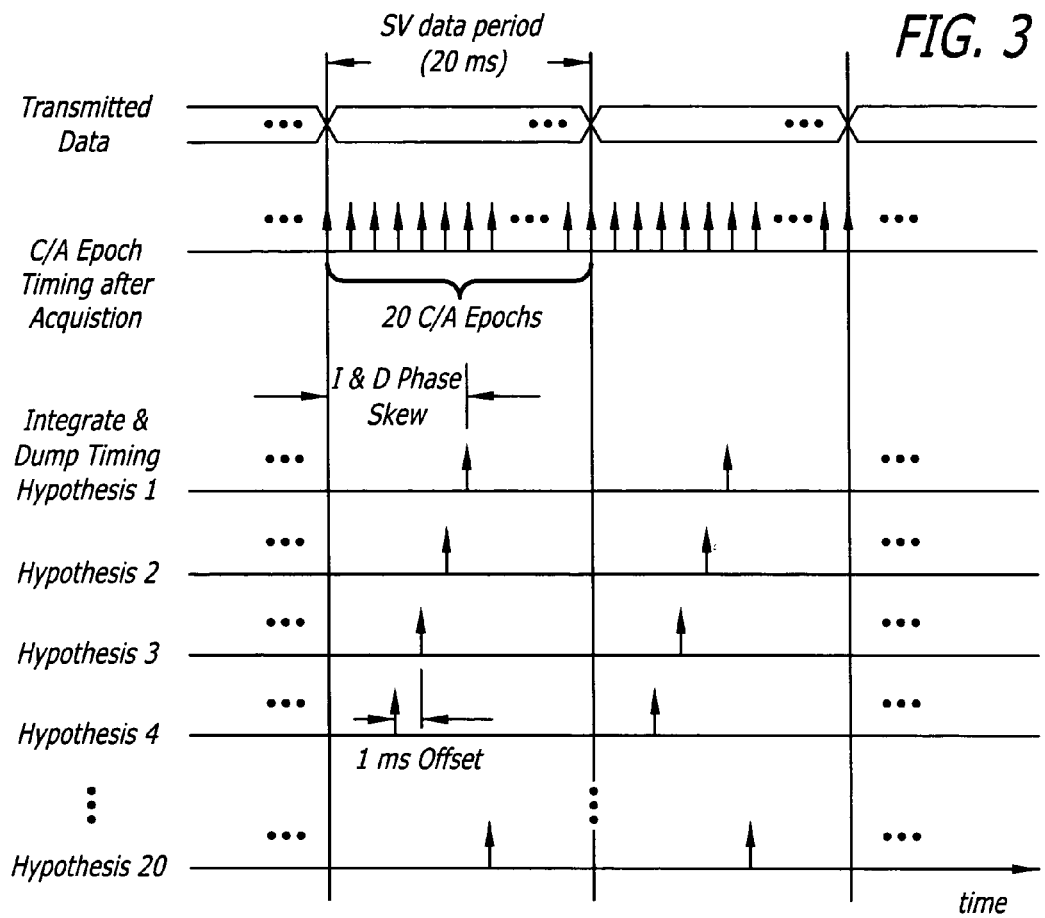
FIG. 3 is a diagram showing illustrative timing relationships among the demodulator channels during the parallel synchronization process of the present invention.

FIG. 3 is a diagram showing illustrative timing relationships among the demodulator channels during the parallel synchronization process of the present invention. The data bit transitions of the received GPS signal coincide with one of twenty possible C/A epochs. In accordance with the novel parallel synchronization methods of the present teachings, a plurality of channels are allocated to searching for the correct phase skew or phase offset of the signal (e.g., which C/A epoch is coincident with data bit transitions). Each channel tracks the carrier phase and PN code phase of the received signal. A unique timing hypothesis is associated with each channel, which is configured to start its integrate and dump timing coincident with one of the twenty C/A epochs that occur during a data bit period. (Integrate and dump timing is derived from knowledge of the hypothesized PN code transmit time; therefore, the transmit time of each channel is offset by one ms, which coincides with the C/A epoch period.) In an illustrative embodiment, twenty channels are allocated to process the twenty possible timing hypotheses in parallel. Depending on the accuracy of any supplied initialization data, fewer than twenty channels may be used to determine the correct timing for subsequent satellites.

Figure 4:
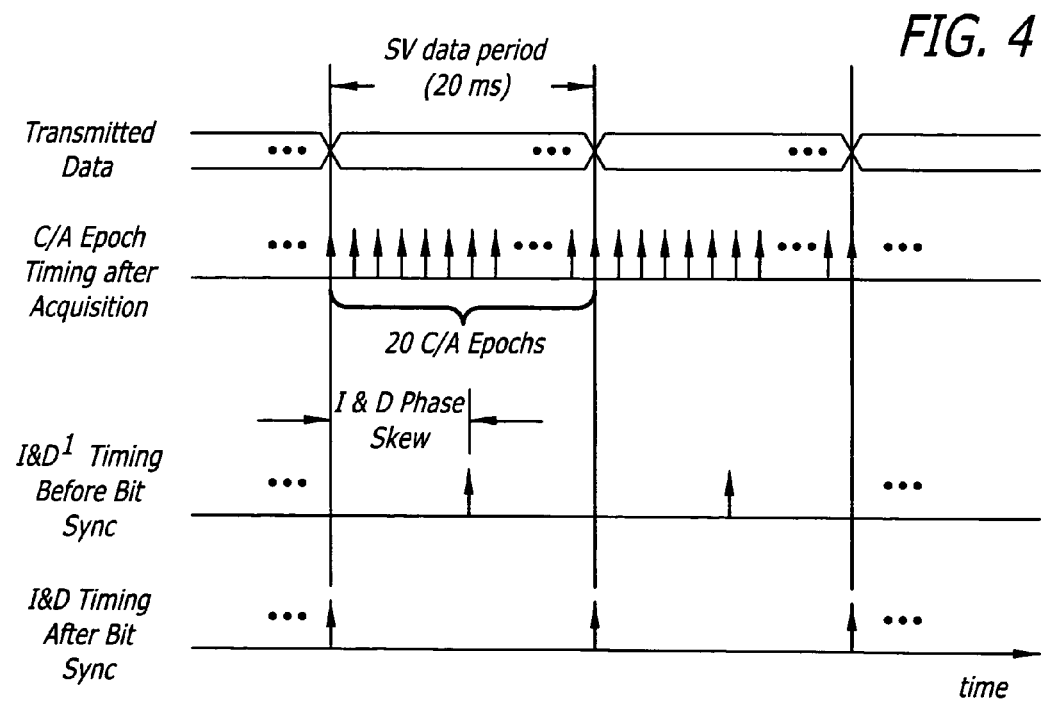
FIG. 4 is a diagram showing the timing of the demodulator channel having the correct timing hypothesis after the parallel synchronization process of the present invention.

If the receiver is not authorized to acquire the precision code (P-code) or its encrypted counterpart (Y-code), hereafter referred to collectively as P(Y)-code, a statistical hypothesis test that uses the carrier frequency error estimate as its observable is performed in parallel to determine which one of the twenty timing hypotheses is correct. Methods for determining the correct timing are well known in the art. Only the channel determined to have the correct timing is retained for tracking the satellite. FIG. 4 is a diagram showing the timing of the demodulator channel having the correct timing hypothesis after the parallel synchronization process of the present invention. By performing synchronization in parallel, the TTFF can be greatly reduced, particularly when interference is present or the received signal strength is low.

Returning to the flow chart of FIG. 2, after synchronization, at Step 88, one channel (with the correct timing) is allocated for tracking the satellite. At Step 90, for the first satellite only, frame synchronization is verified and the HOW is demodulated by the receiver, which allows it to estimate the signal's transmit time to within one PN code chip period. The transmit time in turn permits the receiver to estimate its time (or range) bias with respect to GPS system time, hereafter referred to as GPS time, and the range bias rate due to flaws in the reference oscillator.

At Step 120, select the next satellite, and return to Step 60. The process (including Steps 60, 70, and 88) is then repeated for subsequent satellites until the minimum number of satellites needed to compute a navigation fix is acquired. Note that frame synchronization and HOW demodulation (Step 90) do not need to be performed for the subsequent satellites, thereby further minimizing TTFF. Once a navigation solution (the first fix) is found—i.e., the PVT (position, velocity, and time) states have converged (Step 110), any additional satellites can be acquired and tracked in parallel (Step 130), since the precise GPS time is known and synchronization is unnecessary.

If the receiver is authorized to track P(Y)-code, the steps described above are the same for the first satellite except that the frame synchronization step is eliminated and the correct integrate and dump timing is determined implicitly by the channel that successfully hands over to (acquires) the P(Y)-code signal. Explicit hypothesis testing is unnecessary in this case because only the channel having the correct timing will successfully acquire the P(Y)-code. For each of the remaining satellites in turn, the C/A signal is acquired first and then twenty or more channels are assigned to the satellite in the same fashion as before; however, now the channels attempt to acquire and track the P(Y)-code signal directly thereby eliminating the HOW demodulation step and further reducing TTFF.

The parallel synchronization methods described herein can be exploited to reduce TTFF under a variety of circumstances, including when (1) the GPS receiver is supplied with initial position, velocity, and time information; (2) the receiver is not authorized to acquire and track the P(Y)-code; (3) the receiver is authorized to acquire and track P(Y)-code following C/A acquisition; (4) no information is supplied whatsoever; or (5) any meaningful combination of these conditions exist.

Figure 5:
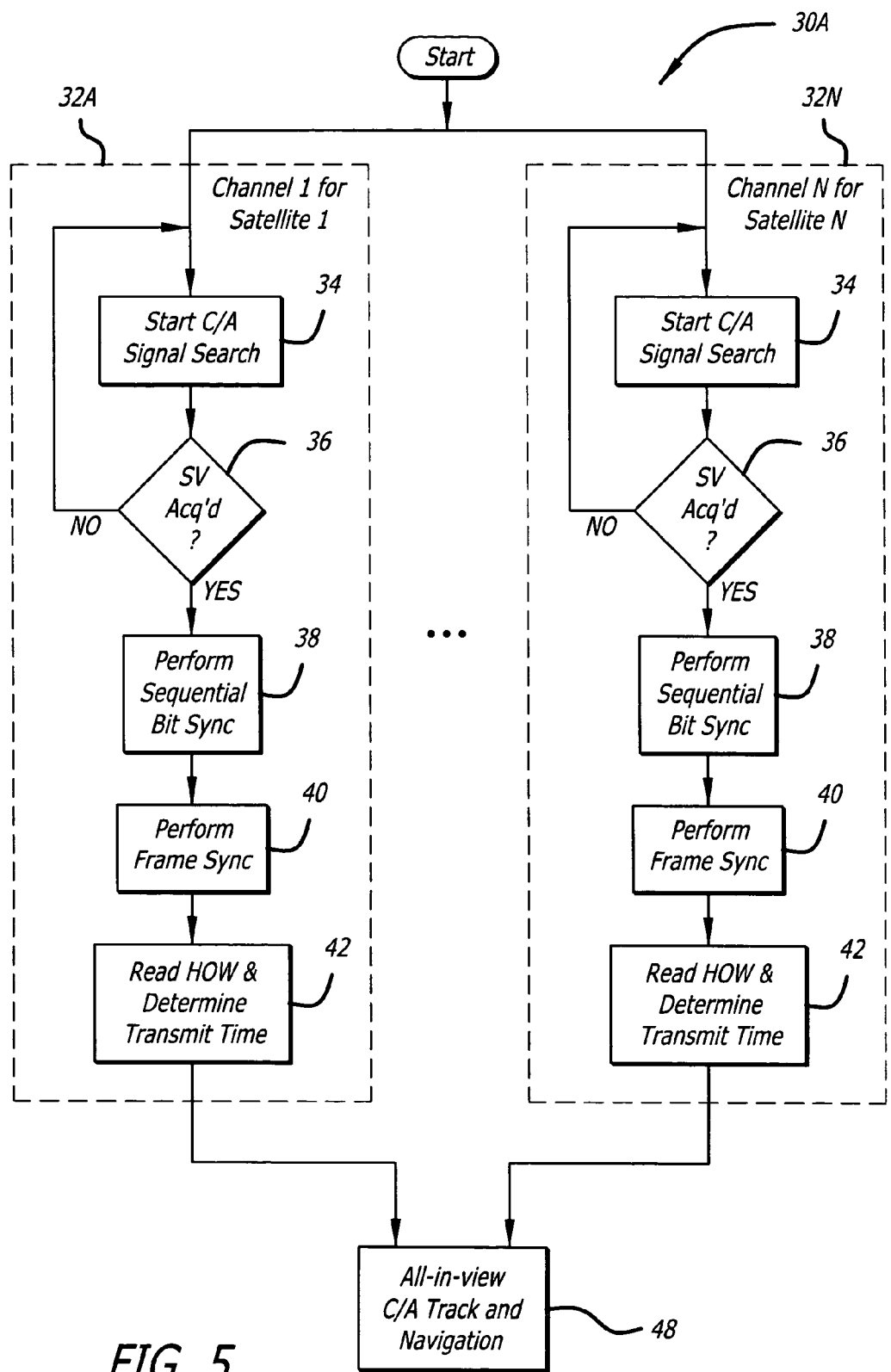
FIG. 5 is a flow chart of a conventional GPS signal processing method for a GPS receiver that is not authorized to acquire and track the P(Y)-code signal.

For the purpose of clarifying the differences between the present invention and prior art, consider FIG. 5, which shows a flow chart of a conventional GPS signal processing method 30A for conditions (1) and (2) jointly. As shown in the figure, all processing steps are performed in parallel for each satellite. Thus if there are twelve satellites in view, twelve channels are required to track the signals from each satellite. Furthermore, the TTFF of the receiver is approximately determined by the amount of time required to complete the processing associated with a particular satellite.

First, at Step 34, each channel, labeled 32A to 32N, begins a C/A signal search. At Step 36, if the signal has been acquired, continue to bit synchronization (Step 38), otherwise continue searching. At Step 38, bit synchronization is performed by sequentially searching for the correct phase offset of the signal. This step involves successively trying different channel timing setups until the correct one is found. Prior art methods ordinarily used to determine the correct timing tend to be sensitive to the frequency of bit transitions during the data collection process and are also susceptible to the effects of interference or low signal strength. Consequently, if there are too few bit transitions while a given timing setup is being tested, or the signal strength fluctuates, the wrong timing hypothesis may be accepted. When this happens, the TTFF may be extended by a considerable amount of time. After bit synchronization, frame synchronization is performed (Step 40), followed by demodulation of the hand-over word (HOW) and computation of the transmit time (Step 42). Each channel then continues to track the signal from its satellite (Step 48).

Figure 6:
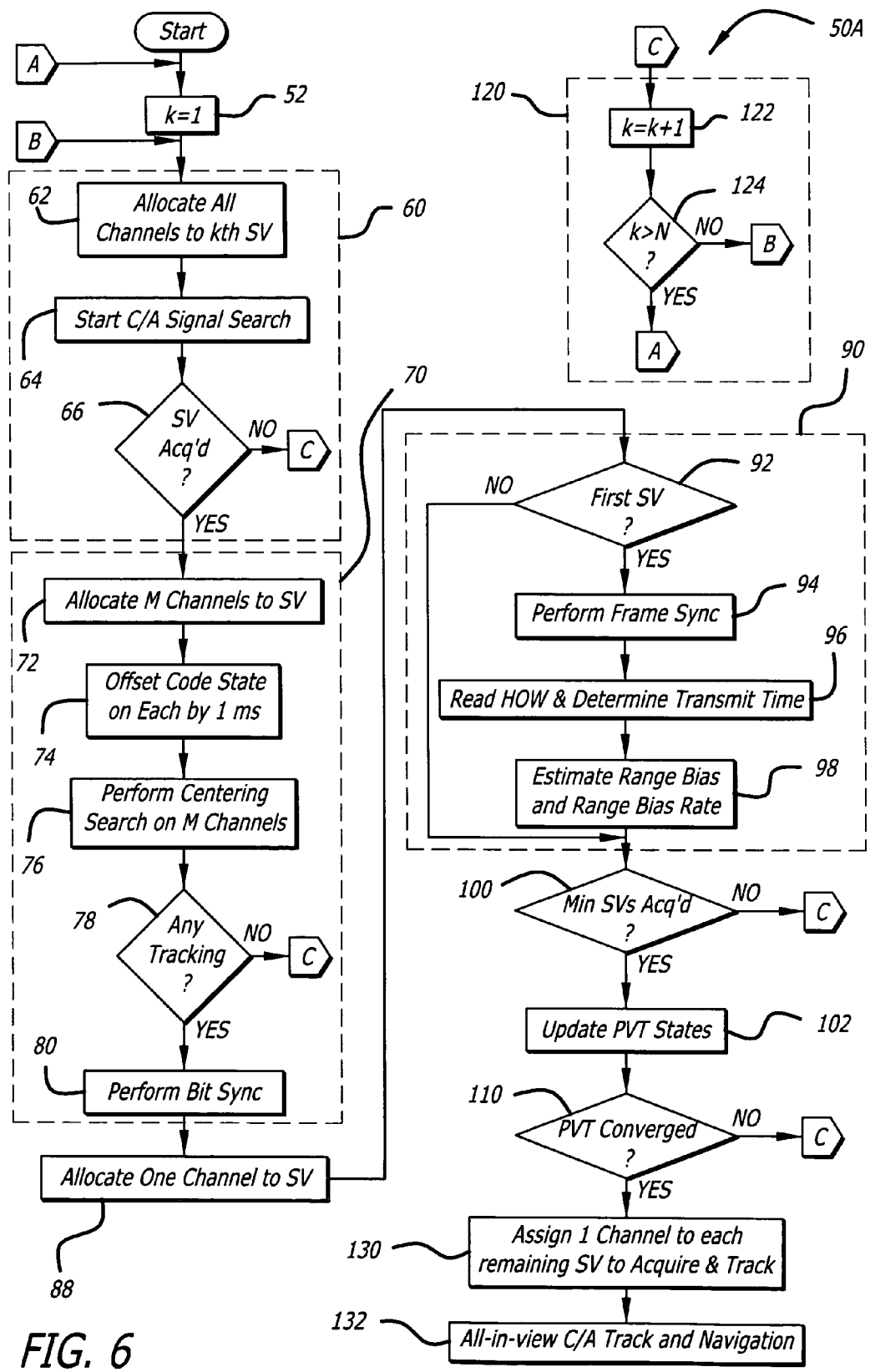
FIG. 6 is a flow chart of an illustrative embodiment of a signal processing method for a GPS receiver that is not authorized to acquire and track the P(Y)-code signal designed in accordance with the teachings of the present invention.

In contrast, FIG. 6 is a flow chart of an illustrative embodiment of a signal processing method 50A for a GPS receiver that is not authorized to acquire and track the P(Y)-code signal designed in accordance with the teachings of the present invention.

First, at Step 52, an index k, corresponding to which satellite is being acquired, is set to 1. Next, at Step 62, all available channels (i.e.; all channels not tracking) are allocated to the k-th satellite. At Step 64, all of those channels perform a search for the C/A signal. At Step 66, if the signal is acquired, continue to synchronization (Step 70); otherwise, move on to the next satellite (Step 120).

In the embodiment of FIG. 6, synchronization (Step 70) is performed using the following steps. At Step 72, M channels are allocated to estimate or track the received carrier phase and PN code phase, where M is a number up to 20. Depending on the accuracy of the initial position, velocity and GPS time estimates supplied to the receiver, fewer than twenty channels may be used to establish bit synchronization for subsequent satellites. In fact, only one channel is necessary if the initial estimates are within 100 km, 150 m/s, and 20 seconds of the actual position, velocity, and GPS time, respectively. At Step 74, the code state of each channel is offset by 1 ms. Thus each channel has a unique timing hypothesis. At Step 76, a "centering" search is performed by each of the M channels to establish C/A carrier and PN code phase tracking. At Step 78, if there is no tracking, move on to the next satellite (Step 120); otherwise continue to Step 80. At Step 80, an algorithm embodied in the parallel synchronization method that exploits phase sensitivities to bit transitions is used to determine and verify the correct timing hypothesis. At Step 88, the channel with the correct timing is allocated to the satellite (other channels are discarded).

At Step 92, if this is not the first satellite acquired, skip ahead to Step 100; otherwise, at Step 94, perform frame synchronization and, at Step 96, demodulate the HOW and determine the transmit time. At Step 98, also for the first satellite only, estimate the range bias and range bias rate.

At Step 100, determine whether the minimum number of satellites has been acquired. As is well known in the art, the minimum number of satellites needed to compute a navigation solution is four; however, more than four may be required if the GDOP (geometric dilution of precision) parameter is large for the first four satellites that have been acquired. If the minimum number of satellites has been acquired, then continue to Step 102; otherwise go on to the next satellite (Step 120). As shown in FIG. 6, Step 120 includes increasing the index k by 1 (Step 122), and returning to Step 62 if k is less than N (the number of satellites in view) or returning to Step 52 if k is greater than N (Step 124).

After the minimum number of satellites has been acquired, at Step 102, update the PVT states. At Step 110, if the PVT states have not converged, go to Step 120 to acquire an additional satellite. Once the navigation solution is found (which determines the TTFF), one channel each can then be allocated to acquire and track the C/A signals of any additional satellites (Step 130), until all satellites in view are being tracked (Step 132).

Figure 7:
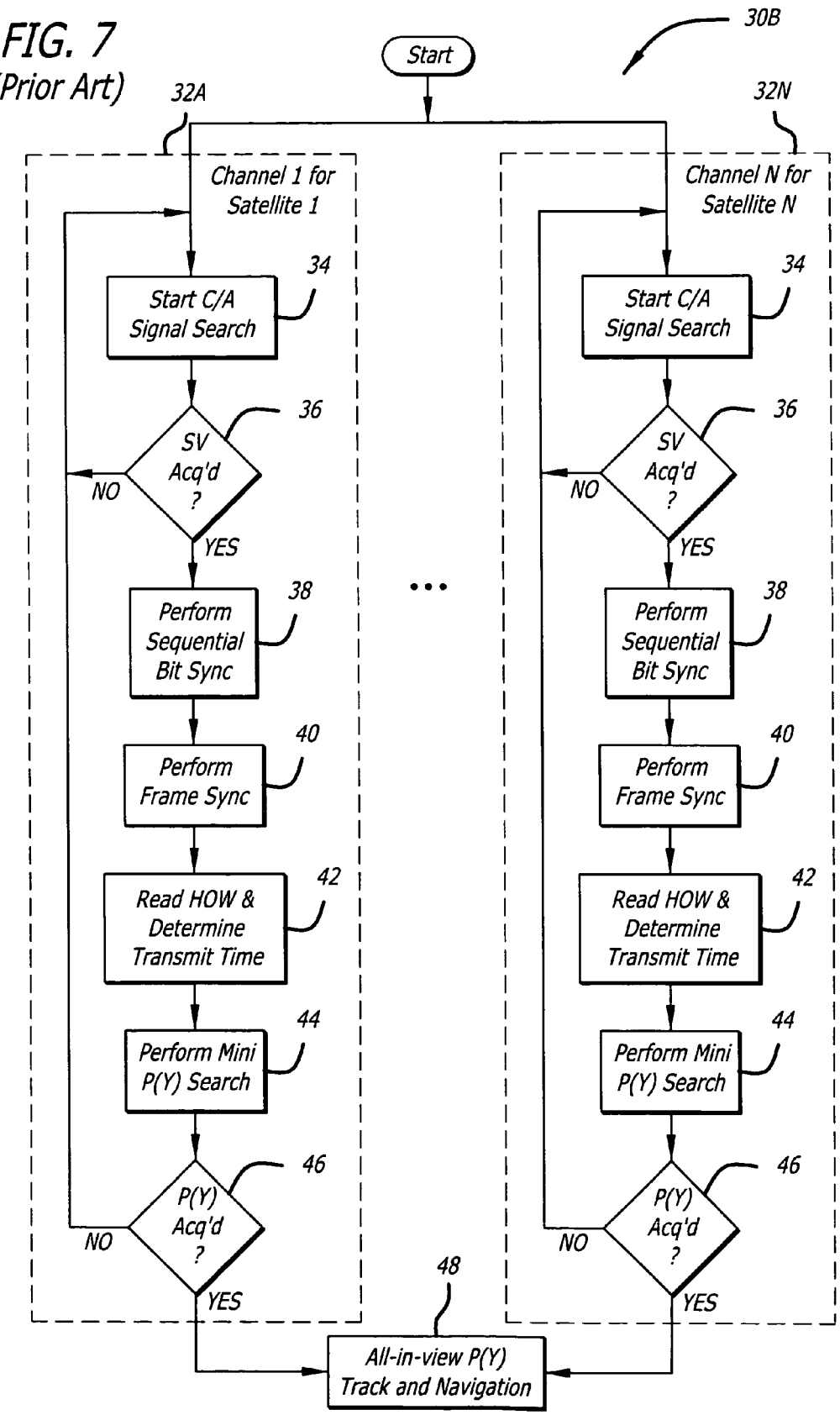
FIG. 7 is a flow chart of a conventional GPS signal processing method for a receiver that is authorized to acquire and track the P(Y)-code signal.

FIG. 7 is a flow chart of a conventional GPS signal processing method 30B for conditions (1) and (3) jointly, when the receiver is authorized to acquire and track the P(Y)-code signal. The processing for this case is similar to that in FIG. 5 except each channel includes an additional Step 44, attempting to acquire the P(Y)-code, and Step 46, returning to Step 34 if the P(Y)-code signal is not acquired and continuing to Step 48 if it is acquired.

Figure 8:
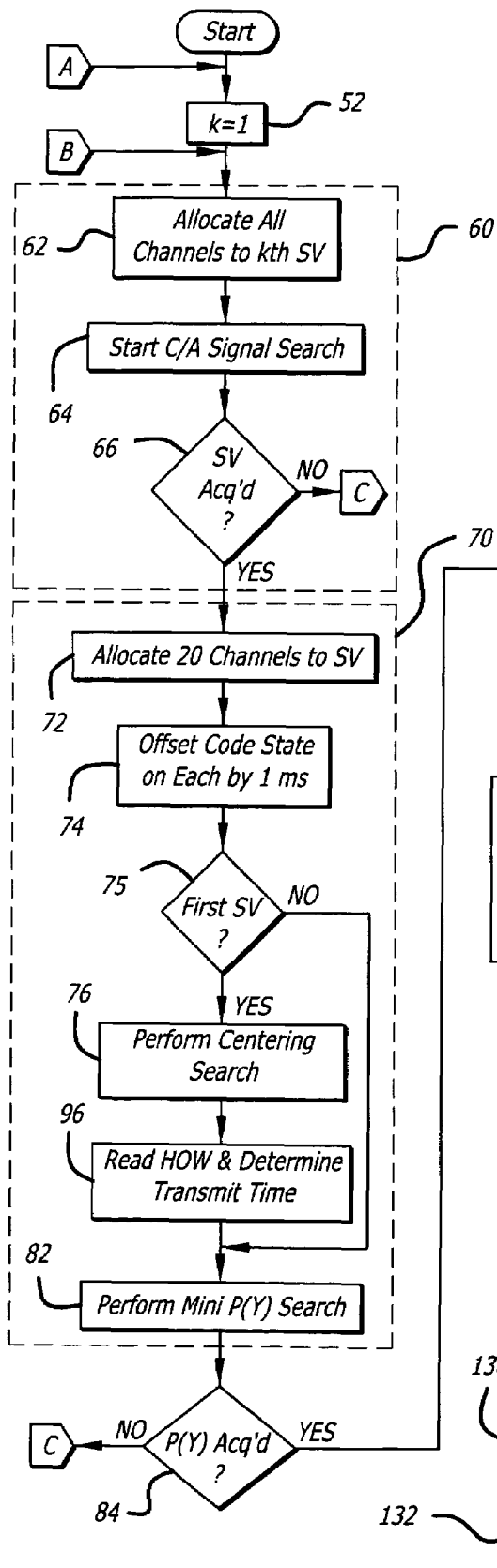
FIG. 8 is a flow chart of an illustrative embodiment of a signal processing method for a GPS receiver that is authorized to acquire and track the P(Y)-code signal designed in accordance with the teachings of the present invention.
Figure 8:
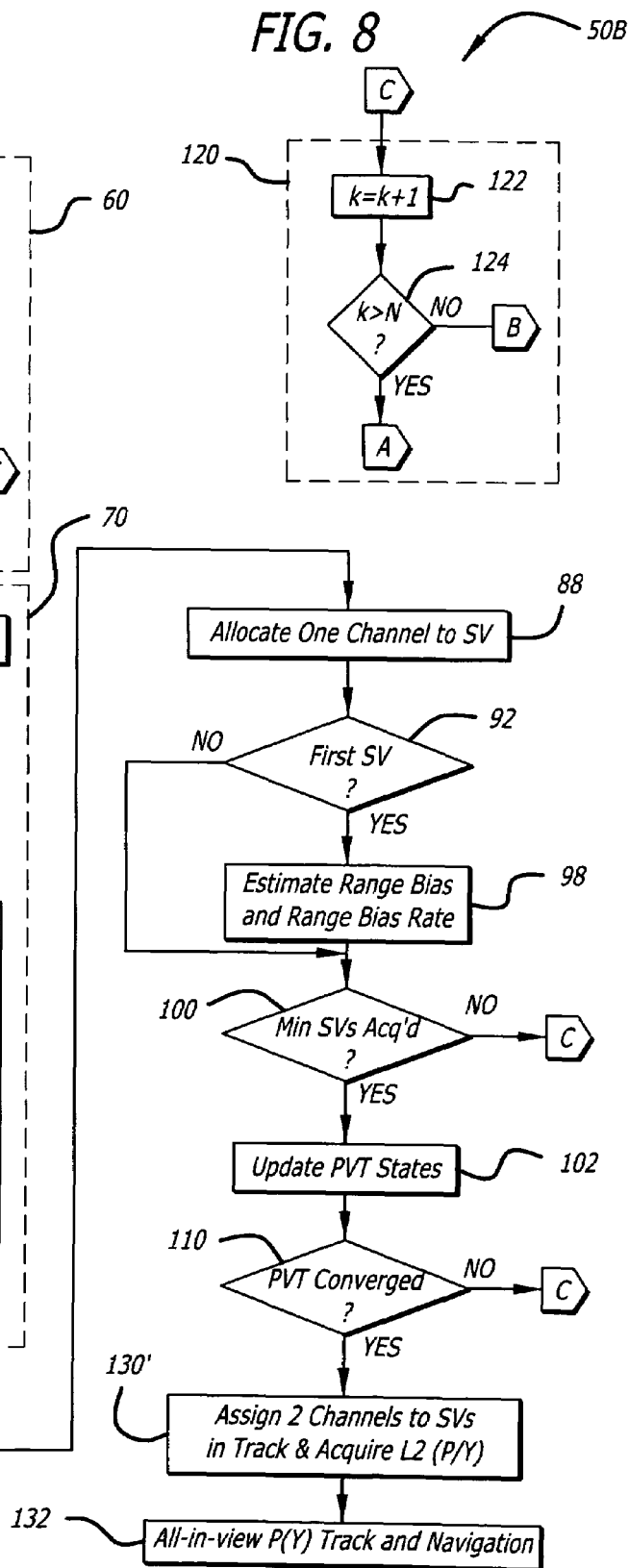

In contrast, FIG. 8 is a flow chart of an illustrative embodiment of a signal processing method 50B for a GPS receiver that is authorized to acquire and track the P(Y)-code signal designed in accordance with the teachings of the present invention. Steps 52 through 66 are the same as in FIG. 6. After the C/A code signal of the satellite has been acquired, at Step 72, twenty channels are allocated to the satellite. At Step 74, the code state of each channel is offset by 1 ms. At Step 75, if this is not the first satellite, then skip ahead to Step 82; otherwise, a centering search is performed by each of the twenty channels to establish C/A carrier and PN code phase tracking (Step 76), and the HOW is demodulated and transmit time determined by each channel in parallel (Step 96). These steps (Steps 76 and 96) may be eliminated for subsequent satellites because of their proximity to each other coupled with the knowledge gained by first acquiring the satellite's C/A code signal. Next, at Step 82, all twenty channels attempt to acquire the P(Y)-code assuming a small uncertainty region (perform a mini-P(Y) search). The correct timing hypothesis is determined implicitly when the P(Y)-code signal is successfully acquired by only one of the twenty channels. This is because the period of the P(Y)-code sequence is one week versus one millisecond for the C/A code. Consequently, the bit and frame synchronization steps are eliminated altogether for this case. At Step 84, if the P(Y)-code was not successfully acquired, then try another satellite (go to Step 120); otherwise, at Step 88, the "winning" channel is retained for tracking the P(Y) carrier and PN code phase.

At Step 92, determine if this is the first satellite. If no, then skip ahead to Step 100; otherwise, estimate the range bias and range rate (Step 98). The remaining steps are the same as in FIG. 6, except that after the PVT states have converged (Step 110), two channels can be assigned to each satellite to track both the L1 signal and L2 signal (Step 130').

Figure 9:
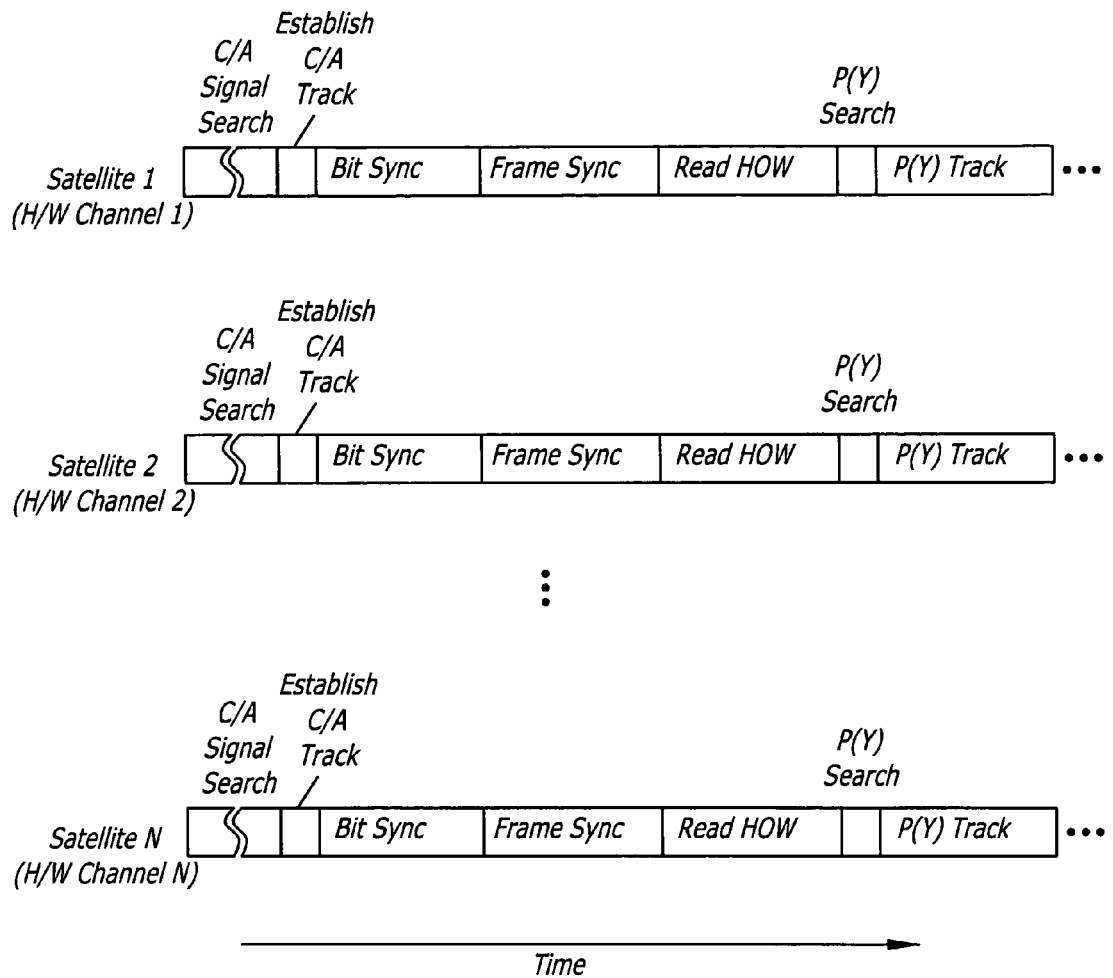
FIG. 9 is a timeline illustrating the sequence of steps versus time for the prior art method of FIG. 7.
Figure 10:
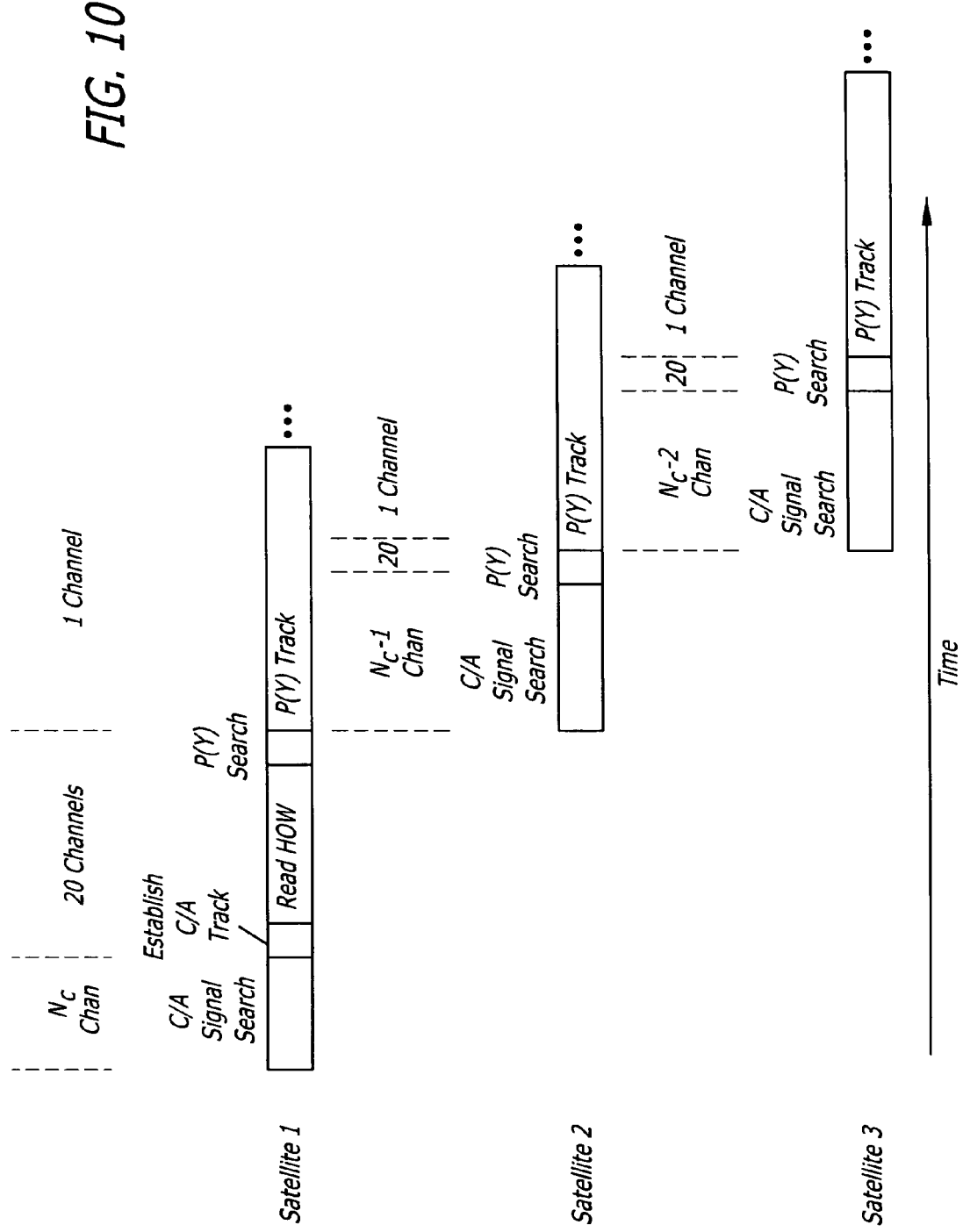
FIG. 10 is a timeline illustrating the sequence of steps versus time for the method of FIG. 8 designed in accordance with the present teachings.

FIG. 9 is a timeline illustrating the sequence of steps versus time for the prior art method of FIG. 7. As shown, each step—including C/A signal search, establishing C/A track (centering), bit synchronization, frame synchronization, reading the HOW, P(Y) signal search, and finally P(Y) tracking—are performed in parallel for each satellite. In contrast, FIG. 10 is a timeline illustrating the sequence of steps versus time for the method of FIG. 8 designed in accordance with the present teachings. As shown, $N_C$ channels first perform a C/A signal search for the first satellite. Twenty channels then establish C/A tracking, read the HOW, and perform a P(Y) signal search. One channel is then allocated to track the P(Y) signal from the first satellite, while $N_C-1$ channels begin a C/A signal search for the second satellite, followed by twenty channels establishing C/A tracking, reading the HOW, and performing a P(Y) signal search for the second satellite. One channel is then assigned to track the P(Y) signal from the second satellite, while $N_C-2$ channels begin a C/A signal search for the third satellite, etc.

Figure 11:
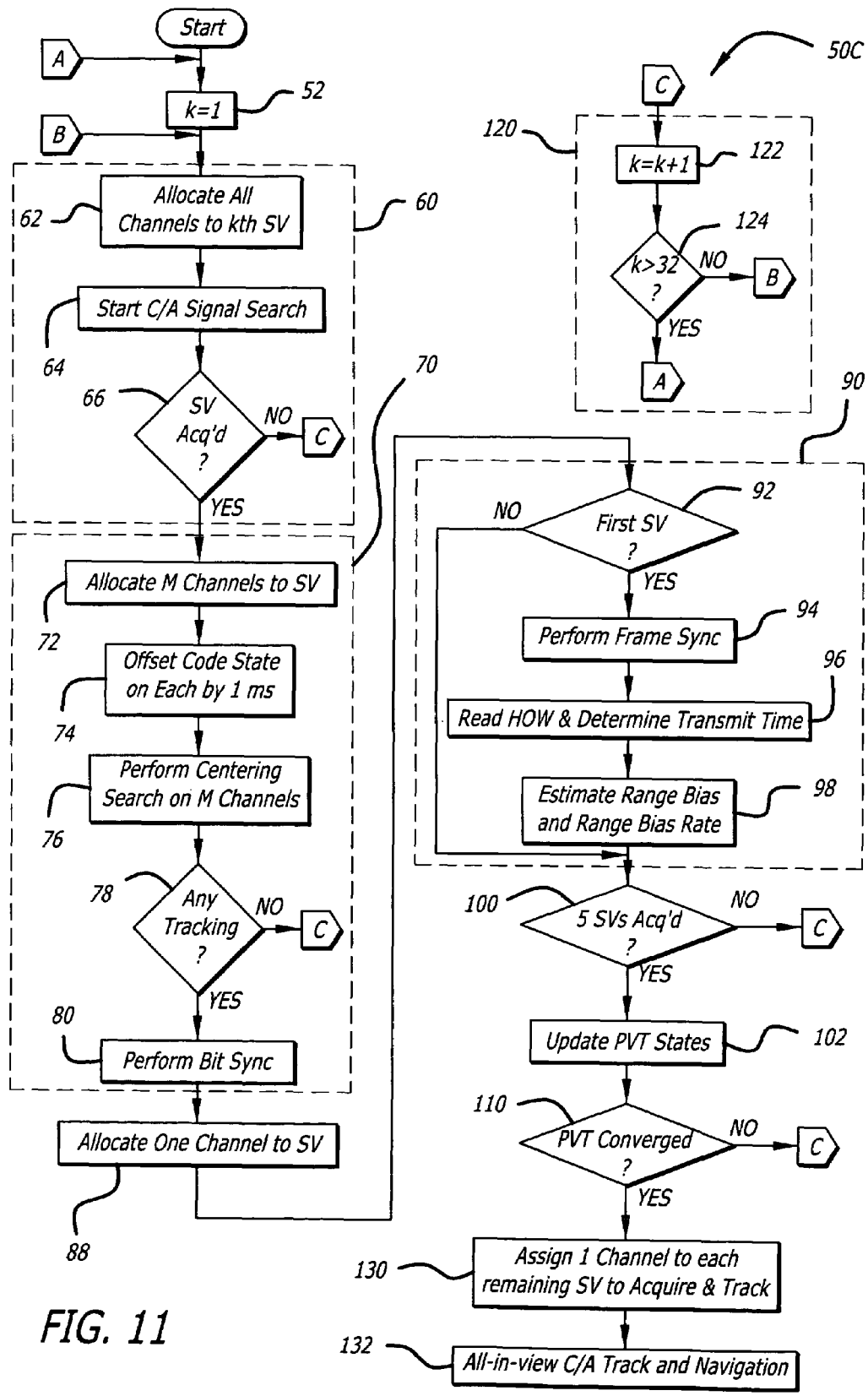
FIG. 11 is a flow chart of an illustrative embodiment of a signal processing method for a GPS receiver that is not supplied with any initial estimates of position, velocity, and GPS time designed in accordance with the teachings of the present invention.

FIG. 11 is a flow chart of an illustrative embodiment of a signal processing method 50C for a GPS receiver that is not supplied with any initial estimates of position, velocity, and GPS time designed in accordance with the teachings of the present invention. The processing steps for this case are the same as in FIG. 6 except that an attempt is made to acquire all satellites in the constellation because the locations of the satellites in view are unknown. Thus, at Step 124, the test becomes whether k is greater than 32 (the total number of satellites) instead of N (the number known to be in view). Also, for Step 100, determining the minimum number of satellites acquired, the minimum number of satellites is set to five instead of the usual four. The first four satellites acquired may give a poor GDOP, resulting in an incorrect navigation solution. Requiring a minimum of five satellites provides for an overdetermined solution, guaranteeing that the PVT states will converge.

Thus, the present invention eliminates the need to always perform the bit synchronization, frame synchronization, and HOW demodulation steps following C/A acquisition. Parallel methods that exploit multiple demodulator channels are employed to resolve bit timing and eliminate the need to demodulate the HOW after the first satellite has been acquired. Eliminating one or both of these steps can reduce TTFF by up to 18 seconds, permits the receiver to be insensitive to the frequency of bit transitions, and significantly improves the receiver's ability to compute a fix in the presence of interference.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A global positioning system (GPS) receiver comprising:
   first means for receiving a GPS signal from a first satellite, said first means including plural demodulator channels and
   second means for instructing said plural channels to process said signal from said first satellite in parallel align an integrate and dump timing of said receiver with a phase of data bits in said signal, wherein each channel processes said signal using a different bit transition phase offset, and wherein said second means includes means for assigning a different integrate and dump timing offset to each said channel and means for determining which of said channels has a correct integrate and dump timing that is aligned with data bit transitions in said signal.

2. The invention of claim 1 wherein said receiver further includes means for allocating one of said channels for tracking said signal from said first satellite using said correct timing.

3. The invention of claim 2 wherein said receiver further includes means for demodulating a hand-over word and determining a GPS transmit time from said signal from said first satellite.

4. The invention of claim 1 wherein said second means includes means for instructing all available channels to search for and acquire a coarse acquisition code signal from said first satellite.

5. The invention of claim 2 wherein said second means includes means for instructing each of said plurality of channels to search for a P(Y)-code signal from said first satellite.

6. The invention of claim 5 wherein one channel that has acquired said P(Y)-code signal is determined to have said correct timing.

7. The invention of claim 2 wherein said receiver further includes means for instructing a plurality of said channels to synchronize a signal from one or more additional satellites in sequence after said correct timing has been determined for said signal from said first satellite.

8. The invention of claim 7 wherein said receiver further includes means for computing a navigation solution from said signals from said satellites.

9. The invention of claim 8 wherein said receiver further includes means for allocating one channel each to track signals from each additional satellite after a minimum number of satellites have been acquired and synchronized.

10. The invention of claim 1 wherein said first means includes a correlator.

11. The invention of claim 10 wherein said correlator is implemented with an application specific integrated circuit.

12. The invention of claim 1 wherein said second means includes a processor.

13. A global positioning system (GPS) receiver comprising:
   a correlator having a predetermined number of demodulator channels and
   a processor adapted to instruct each of a plurality of said channels to track a signal from a first satellite in parallel to align an integrate and dump timing of said receiver with a phase of data bits in said signal, wherein each channel processes said signal using a different bit transition phase offset, and wherein said processor is adapted assign a different integrate and dump timing offset to each said channel and to determine which of said channels has a correct integrate and dump timing that is aligned with data bit transitions in said signal.

14. A method for processing a global positioning system (GPS) signal including the steps of:
   providing a predetermined number of demodulator channels;
   acquiring a signal from a first satellite;
   assigning a different integrate and sump timing offset to each of a plurality of said channels;
   instructing each of said plurality of said channels to track said signal from said first satellite using said assigned integrate and dump timing;
   determining which of said channels has a correct integrate and dump timing that is aligned with data bit transitions in said signal; and
   allocating one channel to track said signal from said first satellite using said correct integrate and dump timing.

15. The invention of claim 14 wherein said method further includes demodulating a hand-over word and determining a GPS transmit time from said signal from said first satellite.

16. The invention of claim 14 wherein said acquiring includes instructing a plurality of said channels to search for and acquire a coarse acquisition code signal from said first satellite.

17. The invention of claim 14 wherein each of said plurality of channels is instructed to search for a P(Y)-code signal from said first satellite using a different timing hypothesis.

18. The invention of claim 14 wherein said method further includes acquiring and synchronizing signals from a number of additional satellites in turn.

19. The invention of claim 18 wherein said synchronizing of a signal from one of said additional satellites includes:
   instructing each of a plurality of channels to track said signal from said additional satellite using a different bit transition phase offset;
   determining which of said channels has a correct offset that is aligned with said signal; and
   allocating one channel to track said signal from said additional satellite using said correct offset.

20. A method for synchronizing a global positioning system (GPS) receiver including the steps of:
   acquiring a signal from a first satellite;
   assigning a different integrate and dump timing offset to each of a plurality of demodulator channels;
   instructing each of said channels to process said signal from said first satellite in parallel using said assigned integrate and dump timing; and
   determining which of said channels has a correct integrate and dump timing that is aligned with data bit transitions in said signal.

21. A global positioning system (GPS) receiver comprising:
   a circuit for receiving a GPS signal, said GPS signal including signals from a plurality of GPS satellites;
   a plurality of processing channels adapted to process said GPS signal in parallel; and
   a processor adapted to instinct each of said channels to acquire and track the signal from the first GPS satellite in parallel to align integrate and dump timing of said receiver with a phase of data bits in said signal, wherein said processor is adapted to assign a different integrate and dump timing offset to each said channel, instruct each channel to process said signal using said assigned integrate and dump timing, and determine which of said channels has a correct integrate and dump timing that is aligned with data bit transitions in said signal.

* * * * *